United States Patent
Toulis

[15] 3,686,669
[45] Aug. 22, 1972

[54] DETECTION AND CLASSIFICATION SYSTEM UTILIZING UNIPOLAR PULSES

[72] Inventor: William J. Toulis, 3175 Cauby St. 036, San Diego, Calif. 92110

[22] Filed: April 24, 1970

[21] Appl. No.: 31,627

[52] U.S. Cl. ............343/5 SA, 343/5 PC, 343/17.1 R
[51] Int. Cl................................................G01s 9/02
[58] Field of Search ..................343/5 R, 5 PC, 5 SA

[56] References Cited

UNITED STATES PATENTS 3,512,124   5/1970   Watson................343/5 SA X

Primary Examiner—T. H. Tubbesing
Attorney—Richard K. MacNeill

[57] ABSTRACT

A detection and classification system utilizing a transmitter to generate a successive series of unipolar pulses which are then radiated into propagation space by a directional radiator; a receiving system to detect with an antenna and amplifier the especially distinctive low-frequency returns which are then filtered, processed and recorded in order to reconstruct and thus to classify the signal returns.

3 Claims, 4 Drawing Figures

INVENTOR.
WILLIAM J. TOULIS

INVENTOR.
WILLIAM J. TOULIS

DETECTION AND CLASSIFICATION SYSTEM UTILIZING UNIPOLAR PULSES

BRIEF DESCRIPTION OF THE INVENTION

The present invention relates closely to customary systems of detection, such as in radar and in sonar, but with the very distinctive difference that the projected wave energy is unipolar rather than bipolar in terms of the usual operating frequencies in a pulse length. In general, the required directivity and frequency characteristics of radar and sonar may be duplicated closely with unipolar pulse systems even though half the spaces, as occupied by one of the two polarities in a bipolar pulse system, are left unenergized. However, unlike existing detection systems, the unipolar pulse system should yield echoes and other returns from gradual as well as sharp changes in impedance in propagation space; that is, the returns from gradual changes are not self-cancelling, as with bipolar pulses (R. R. Carhart, J. Appl. Phys. 24 P. 929, 1953) but the amplitudes are proportional to the change in impedance over the unipolar pulse duration, while the length of the returns is commensurate with the length of the gradients and especially if a gradient is constant over an interval longer than the projected unipolar pulse. Thus, these returns may contain pulses of one or the other polarity, which are longer than those which were projected and, consequently, all frequencies down to zero frequency may have to be monitored if the specific spectrum of an object or perturbation is unknown. As a result, an unambiguous reconstruction of the profiles of various perturbations now becomes potentially feasible and especially when the probing is normal to a layered medium.

The concept of generating and radiating unipolar pulses is not comprehended generally even though the elemental unit of radiation, the quantum, fits very smoothly into this rarely appreciated category. An example of a unipolar pulse is the acoustic shock wave or impulse from an explosion which is used to detect targets in the ocean. Such single impulses, however, are generally uncontrolled in terms of either frequency or directional propagation in space; thus, they are highly inefficient when the desired profile corresponds to one of many profiles in space that can generate conflicting signal returns simultaneously. Actually, the imperfections of a single impulse due to its broad frequency spectrum, can be overcome almost completely by rounding out the shape of the impulse and then using a number of them in fairly close succession to form the desired pulse length. The frequency and harmonic content of the resulting pulse could be closely identical to that of a bipolar pulse with the possible exception of the DC component which need not be radiated as it pervades space at most, if not all, times. It is emphasized that the terms "space" and "radiate" apply to any propagation media and signal propagation therein.

An object of the present invention is the provision of both detecting and classifying objects and perturbations in space through reliance on the projection of unipolar type of wave energy.

A further object of the invention is the provision of recreating unambiguously the profiles in layered media.

A third object is the generation and radiation of unipolar type of pulses that may be focused in various directions in space by antennas and arrays.

A fourth object is the reception and processing of the signal returns for evaluating the conveyed information and classifying perturbing objects.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

DETAILED DESCRIPTION OF THE DRAWINGS

Figure 1:
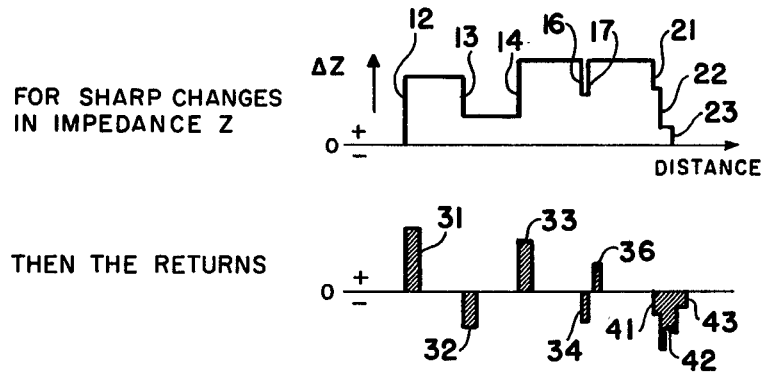
FIG. 1 illustrates the response to be expected from sharp changes in the wave velocity or impedance in propagation space when irradiated with a rectangularly shaped unipolar impulse.

Referring to FIG. 1, sharp changes in the amplitude of the characteristic impedance in propagation space are shown at 12, 13, 14, 16, 17, 21, 22 and 23, while the corresponding signal returns are shown at 31, 32, 33, 34, 36, 41, 42 and 43 when the irradiating impulse is rectangular for convenience in representation. These changes of relative amplitudes are plotted vertically with distance plotted horizontally. In general, the returns are identical in shape to the transmitted impulse, as illustrated by the positive returns at 31 and 33 and negative return at 32. However, if successive changes of opposite polarity occur within a distance less than the length of the transmitted impulse, then the signal returns are narrower, as at 34 and 36, so that the frequency content will extend well above that of the irradiating impulse; on the other hand, the frequency content will lie primarily below that of the impulse if the rapidly succeeding sharp changes have the same polarity, since now the return has effectively been stretched out as at 41, 42 and 43 in conformance to the length of the now overlapping perturbations due to 21, 22 and 23.

Figure 2:
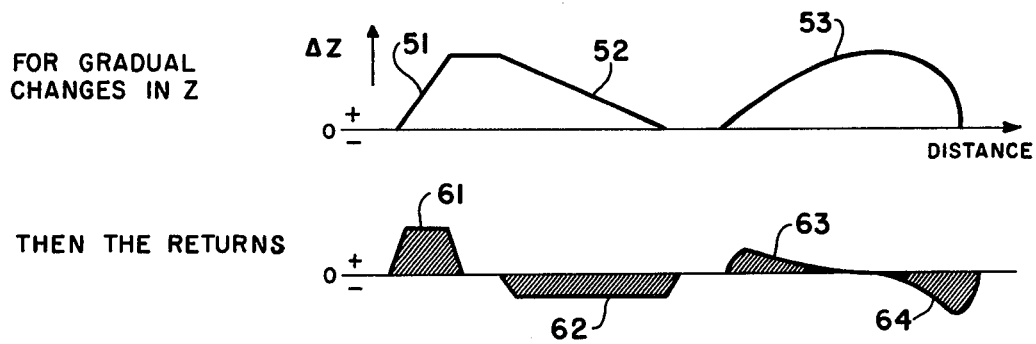
FIG. 2 illustrates the response to be expected from gradual changes in wave velocity or impedance in a propagation medium when irradiated with a rectangularly shaped unipolar pulse.

Referring to FIG. 2, the changes in impedance amplitude and return amplitude are again plotted against distance. The profile changes in propagation space are presumed to be longer than the length of the irradiating impulse and, consequently, the returns are proportionately longer if the variations in the perturbations are continuous and do not lead to a change in polarity. Thus, the constant gradients of 51 and 52 in the impedance amplitude lead respectively to the positive return at 61 and the negative return 62; the amplitude in each case should be proportional to the slope over the interval of the rectangular impulse. Similarly, the returns for the variable gradients of 53 are shown at 63 and 64.

Figure 3:
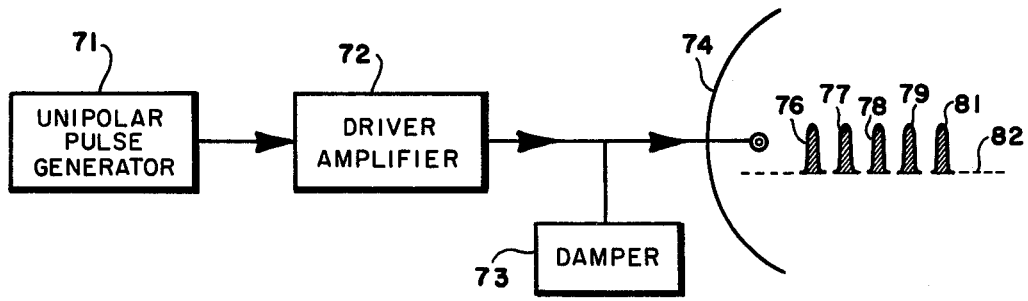
FIG. 3 is a schematic representation of the preferred embodiment of the projector of the present unipolar pulse detection and classification system.

Referring to FIG. 3, the combination consisting of the unipolar pulse generator at 71, the driver-amplifier at 72, the damper at 73, and the directional antenna at 74, generates and radiates a series of impulses such as at 76, 77, 78, 79 and 81, which together constitute the unipolar pulse with the zero axis at 82. Ideally, the Q of the antenna should approach zero, but a value of the order of unity might be tolerated since the projected pulse does not have to be completely unipolar.

Figure 4:
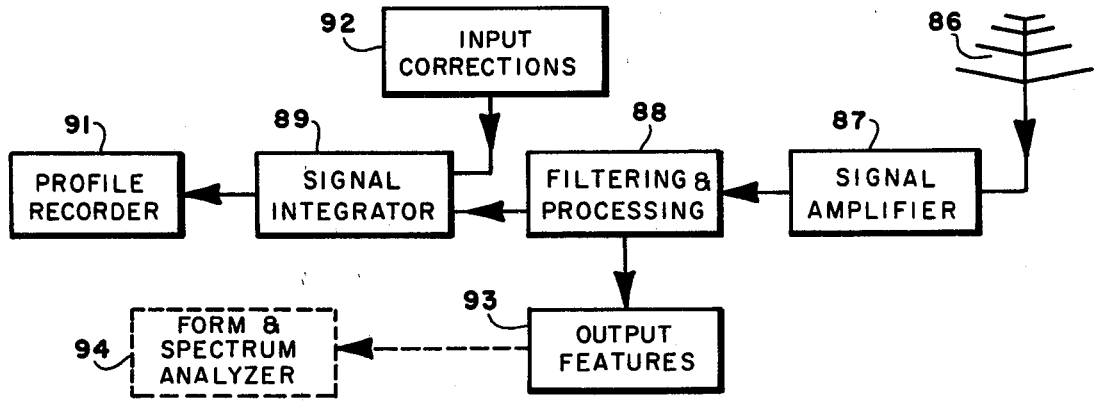
FIG. 4 is a schematic representation of the preferred embodiment of the receiver of the present unipolar pulse detection and classification system.

Referring to FIG. 4, the detecting system consists of the broadband antenna 86, a signal amplifier 87, a filter and processor 88, a signal integrator at 89, and a profile recorder at 91. Additional components, such as for various predetermined corrections at 92, and examination of various output features at 93, with a form and spectrum analyzer at 94, would provide greater perspective of the signal returns.

OPERATION OF THE PROFILING SYSTEM

An unambiguous reconstruction of the velocity or impedance profile in propagation space is possible with unipolar pulses partly because an increase or decrease in the wave impedance will yield correspondingly positive or negative returns in the manner defined and depicted in FIGS. 1 and 2, and partly because the amplitude of the signal returns will be proportional to the change in impedance in the interval of the pulse radiated by the directional projector system in FIG. 3 relative to the immediately preceding characteristic impedance of propagation space. In practice, both the sharp and gradual changes in the impedance profile of layered media may be recreated very closely when the probing is preferably normal to the layering and when a correction is allowed for any absorption and appreciable scattering in the propagation media.

The basic function of the receiver system in FIG. 4 may be summarized as follows for probing layered space: The receiving antenna 86 should have a broad frequency response and should be directional if noise in space is a limiting factor; the signal amplifier may have to respond to all frequencies up to and including those in the projected unipolar pulse; the filtering and processing arrangement 88 should, in part, minimize any interfering signals or noise that cannot be avoided by the directivity of the receiving antenna and, in part, compensate for any uneven response in the receiving antenna and amplifier; the signal integrator 89 is essentially a capacitor in the form of an electrometer that stores the positive and negative charges which are conveyed by the processed signal returns; and the profile recorder 91 should plot the characteristic impedance profile of the layered media in terms of the voltage generated by the signal integrator.

The detailed accuracy of the profile plotted by the recorder 91 will depend on a number of factors: the time constant of the recording mechanism as well as that of the signal integrator can be limiting factors; the length of the projected pulse also sets a limit which might be minimized by relying on a fairly short pulse for strong gradients and a longer one for weak gradients; extremely weak gradients of long duration, as well as any absorption and other factors may be estimated and introduced as input corrections 92. Moreover, if the integrator and recorder time constants are unduly long, then sharper changes may be detected separately and in conjunction with other output features in 93 which may require further analysis through 94 for both the form and frequency spectrum. Alternatively, the wave velocity rather than the impedance may be plotted for the profile output if one of the two principal controlling parameters is constant or predictable; the permeability constant for electromagnetic waves and the density for acoustic waves, for example. In this form, the velocity may now be plotted as a function of distance rather than time, since the absolute velocity is now known instantaneously and the abscissa velocity of the recorder may be modulated accordingly.

CLASSIFICATION AND OTHER FACTORS

For situations other than the probing of layered media, the various returns from objects and finite perturbations may not be reconstructible to yield an exactly proportional profile of all the changes in impedance without some prior knowledge of the perturbing medium. This is because the returns are not likely to be predictably specular and thus it would be difficult to estimate an appropriate correction to the impedance profile as carved by the irradiated cone of space. In practice, such deviations from the true profile are not serious because the profiles of objects need to be known only as indelible signatures or fingerprints which can thus serve to classify an object without having to refer to the specific profile of space as an absolute standard. Such distinctive classification with unipolar pulses is a highly desirable feature since it is inherently much more diversified than the bipolar type of radar/sonar system whose returns are limited essentially to the frequency band of the projected pulse. More specifically, the bipolar systems cannot, in particular, distinguish readily between specific targets and less bulky but resonant wires in the case of radar, and air sacs of fish, in the case of sonar; on the other hand, the corresponding returns with the unipolar pulse system will be similar to bipolar returns at frequencies in the band of the projector, but radically different at frequencies below it; the returns will be practically zero for the resonantly small objects, but appreciable from a typical target and especially at its lowest resonant frequency where returns with some bipolar "ringing" might be observed.

Although a low Q for the antenna projector system in FIG. 3 is a desirable feature for radiating unipolar pulses, the essential conversion function may be performed from an existing bipolar antenna system simply by introducing in front of it an array of dipoles with inbuilt diodes and resistive loads to absorb and possibly reflect back one of the polarities but not the other.

The methods described so far are readily applicable for the generation and projection of unipolar pulses for the electromagnetic field, but not for the acoustic field. This is because the polarity of the acoustic pressure field changes when the direction of the diaphragm motion is reversed; thus, the return of the diaphragm to its initial position must be done at a slower rate and especially at frequencies where the radiation loading is lower than at the operating frequency; this action prevents an equal amount of energy from being radiated. This scheme is readily applicable with a cylindrical parabola where one-half of the radiating elements may be used at a time while the others return to their initial position at one-fourth the rate of displacement. Rectangular arrays may be used similarly but with a smaller proportion of the elements being used to radiate at any one time. An alternative arrangement for low-power applications would rely on a successive series of small displacements before the diaphragm is returned slowly to its initial position in order to initiate a new pulse.

However, if high acoustic power is a requirement in water (with an economy of projector equipment), then the simplest procedure would involve elimination, or appreciable reduction, of the negative pressure pulses through cavitation. The latter may be self-induced or abetted with cavitation at a much higher frequency, and especially if the high frequency source is enclosed within a compliant tube wherein the static pressure of the enclosed liquid is low compared to the external pressure for ease in inducing cavitation at depths well below the air-water interface.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A detection and classification system utilizing unipolar pulses comprising:
    directional unipolar pulse transmitting means with radiated energy in limited parts of frequency spectrum;
    receiving means adapted for receiving target signal returns in broad frequency spectrum resulting from pulses transmitted by said directional unipolar transmitting means; and
    readout means coupled to said receiving means.

2. The detection and classification system utilizing unipolar pulses of claim 1 wherein:
    said readout means includes a profile recorder and frequency spectrum analyzer.

3. The detection and classification system utilizing unipolar pulses of claim 1 wherein:
    said readout means includes a form and frequency spectrum analyzer.

* * * * *